United States Patent
Müller et al.

(10) Patent No.: US 12,282,496 B2
(45) Date of Patent: Apr. 22, 2025

(54) ACCESS TO DATA OF A DATA ANALYSIS SYSTEM BY EXTERNAL DATABASE SYSTEMS

(71) Applicant: International Business Machines Corporation, Armonk, NY (US)

(72) Inventors: Jens Müller, Stuttgart (DE); Felix Beier, Haigerloch (DE); Vassil Radkov Dimov, Stuttgart (DE); Eirini Kalogeiton, Stuttgart (DE); Johannes Severin Kern, Boeblingen (DE)

(73) Assignee: International Business Machines Corporation, Armonk, NY (US)

( * ) Notice: Subject to any disclaimer, the term of this patent is extended or adjusted under 35 U.S.C. 154(b) by 132 days.

(21) Appl. No.: 18/337,684

(22) Filed: Jun. 20, 2023

(65) Prior Publication Data

US 2024/0256569 A1    Aug. 1, 2024

(30) Foreign Application Priority Data

Jan. 30, 2023    (GR) .............................. 20230100070

(51) Int. Cl.
*G06F 16/27*    (2019.01)
*G06F 16/23*    (2019.01)

(52) U.S. Cl.
CPC ........ *G06F 16/273* (2019.01); *G06F 16/2379* (2019.01); *G06F 16/278* (2019.01)

(58) Field of Classification Search
CPC .. G06F 16/273; G06F 16/2379; G06F 16/278; G06F 16/2358; G06F 16/27
See application file for complete search history.

(56) References Cited

U.S. PATENT DOCUMENTS

| | | | | |
|---|---|---|---|---|
| 7,194,487 | B1* | 3/2007 | Kekre | G06F 11/2064 |
| 2016/0371358 | A1* | 12/2016 | Lee | G06F 16/2343 |
| 2019/0332582 | A1 | 10/2019 | Kumar | |

(Continued)

OTHER PUBLICATIONS

Author Unknown, "Synchronization", IBM Documentation, PureData System for Analytics, 1.6, https://www.ibm.com/docs/en/psfa/1.6?topic=overview-synchronization, Last updated Mar. 5, 2021, pp. 1-3.

(Continued)

*Primary Examiner* — Albert M Phillips, III
(74) *Attorney, Agent, or Firm* — Edward J. Wixted, III

(57) ABSTRACT

The present disclosure relates to a method for enabling access to data of a data analysis system by a set of one or more external database systems. The data analysis system comprises a source database system and target database system. The data analysis system is configured for synchronizing the data in the source database system with the target database system using a primary source transaction log in the source database system. The method comprises: creating a secondary transaction log. Data changes applied at the target database system may be received from the target database system. At least one log entry that represents each received data change may be creating in the secondary transaction log. The secondary transaction log may be used by the set of external database systems for applying data changes according to the secondary transaction log, thereby storing the data in the set of external database systems.

13 Claims, 10 Drawing Sheets

(56) References Cited

U.S. PATENT DOCUMENTS

2020/0057752 A1*  2/2020  Tofano ..................... G06F 9/54
2020/0364185 A1   11/2020  Beier
2020/0364240 A1*  11/2020  Martin ................. G06F 16/273
2021/0279203 A1    9/2021  Kuchibhotla
2022/0019600 A1    1/2022  Dageville

OTHER PUBLICATIONS

Disclosed Anonymously, "A Method to Detect and Replicate Non-Logged Changes to A Source Data Store Using Log Injection", IPCOM000269373D, https://ip.com/IPCOM/000269373, Apr. 11, 2022, pp. 1-6.

\* cited by examiner

ACCESS TO DATA OF A DATA ANALYSIS SYSTEM BY EXTERNAL DATABASE SYSTEMS

BACKGROUND

The present invention relates to the field of digital computer systems, and more specifically, to a method for enabling access to data of a data analysis system.

Many systems exist for moving data from one relational system to another. These systems can be classified into two categories: full refresh systems that copy entire data sets and change data capture (CDC) systems that optimize transfers by applying changes only. CDC systems enable a change data capture service such that only the data in a source system of the CDC system that has actually changed are updated in a target system of the CDC system.

SUMMARY

Various embodiments provide a method for enabling access to data of a data analysis system, computer program product and system as described by the subject matter of the independent claims. Advantageous embodiments are described in the dependent claims. Embodiments of the present invention can be freely combined with each other if they are not mutually exclusive.

In one aspect, the invention relates to a method for enabling access to data of a data analysis system by a set of one or more external database systems, the data analysis system comprising a source database system and target database system, the data analysis system being configured for synchronizing the data in the source database system with the target database system using a primary source transaction log in the source database system and a primary target transaction log in the target database system. The method comprises: creating a secondary transaction log; receiving from the target database system data changes applied at the target database system; creating in the secondary transaction log for each received data change at least one log entry that represents the received data change; and providing the secondary transaction log to the set of external database systems for applying data changes according to the secondary transaction log, thereby storing the data in the set of external database systems.

In one aspect the invention relates to a computer program product comprising a computer-readable storage medium having computer-readable program code embodied therewith, the computer-readable program code configured to implement the method of the above embodiment.

In one aspect the invention relates to a computer system for enabling access to data of a data analysis system, the computer system comprising a secondary transaction log system, the data analysis system comprising a source database system and target database system, the data analysis system being configured for synchronizing the data in the source database system with the target database system using a primary source transaction log in the source database system and a primary target transaction log in the target database system. The secondary transaction log system is configured for creating a secondary transaction log; receiving from the target database system each data change applied at the target database system; creating in the secondary transaction log for each received data change at least one log entry that represents the received data change; providing the secondary transaction log to the set of external database systems for applying data changes according to the secondary transaction log, thereby storing the data in the set of external database systems.

BRIEF DESCRIPTION OF THE DRAWINGS

In the following embodiments of the invention are explained in greater detail, by way of example only, making reference to the drawings in which.

DETAILED DESCRIPTION

Figure 1:
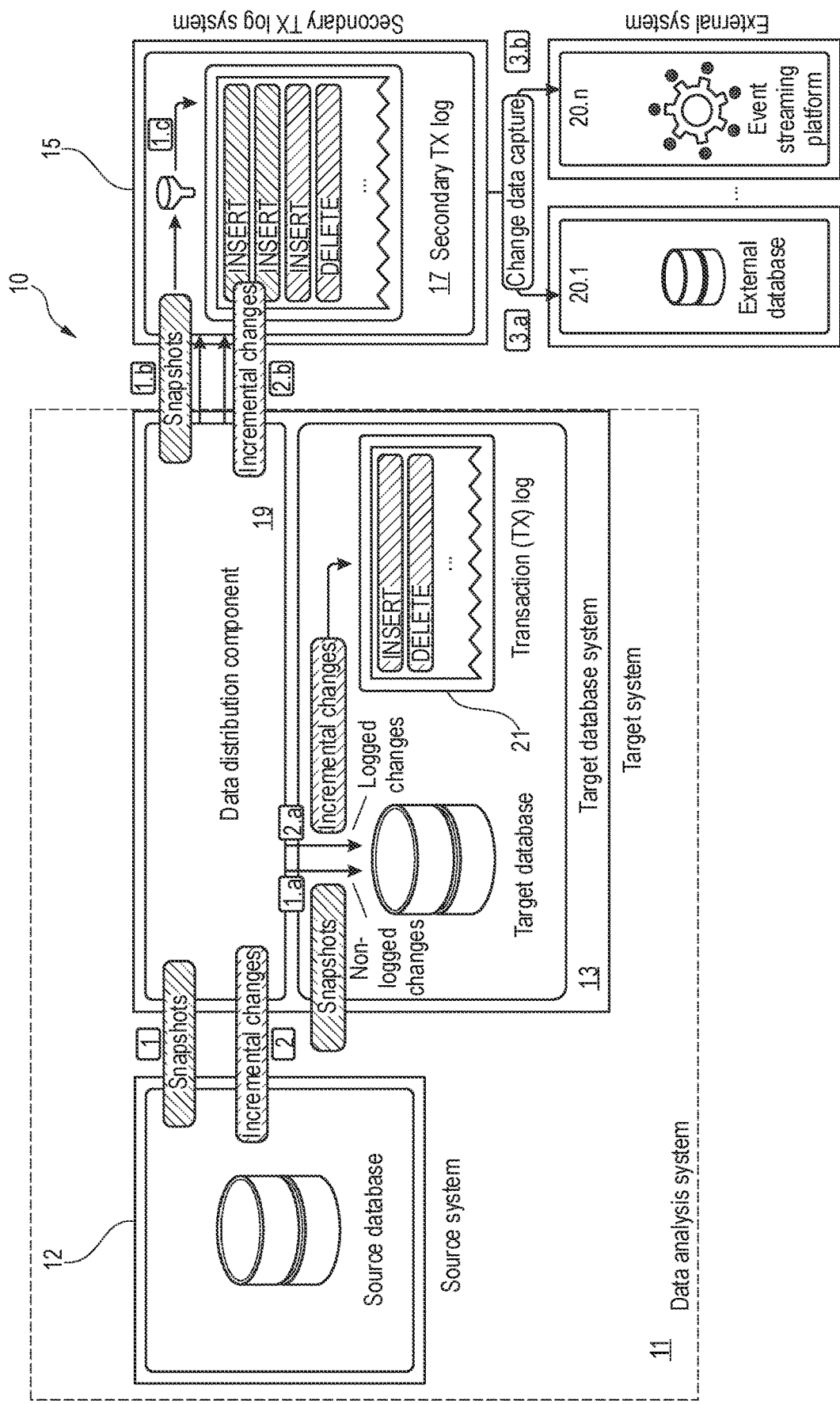
FIG. 1 is a block diagram of a computer system in accordance with an example of the present subject matter.

The descriptions of the various embodiments of the present invention will be presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The data analysis system comprises the source database system and the target database system. The data analysis system may, for example, be a data warehousing system or master data management system. The data analysis system may enable data warehousing or master data management or another technique that uses a source and target database systems, wherein the target database system comprises a target database that is configured to receive/comprise a copy of a content of a corresponding source database of the source database system. The source database system may, for example, be a transactional engine and the target database system may be an analytical engine. For example, the source database system may be an online transaction processing (OLTP) system and the target database system may be an online analytical processing (OLAP) system. The source database system may comprise a source dataset and the target database system may comprise a target dataset. The source dataset may be part of a source database and the target dataset may be part of a target database. The source and target datasets may be stored in a same or different format. The formats may differ in encryption, compression, row-oriented vs. column-oriented storage, etc. For example, the source dataset may be stored in a row-oriented format and the target dataset may be stored in a column-oriented format. In other terms, the target dataset may be stored by column rather than by row. The source dataset may comprise tables, referred to as source tables, and the target dataset may comprise corresponding target tables. The content of the source dataset may be changed by one or more database transactions. The data analysis system may be configured to synchronize the content of the source tables of the source database system with the corresponding target tables of the target database system.

The synchronization may be performed using one or more synchronization programs. The synchronization programs may, for example, comprise a load program and a replication program. The two programs may differ in the amount and frequency of copying data from a source table to a target table. The load program may copy the whole content of the source table into corresponding target table. The replication program may replicate individual changes from a source table to a corresponding target table by inspecting a transaction log, referred to as primary source transaction log, of the source database system. Thus, the data change (also referred to as change) that is propagated using the load program may be referred to as a loaded data change or first type data change and the data change that is propagated using the replication program may be referred to as incremental change or second type data change. The transaction logging may also be performed at the target database system by maintaining a primary target transaction log. The primary target transaction log may differ from the primary source transaction log in that not all operations are logged at the target database system, e.g., transaction logging may be disabled in the target database system for the first type data changes, e.g., during the creation of an initial copy of a target table. For example, the primary target transaction log may only contain log entries of applied incremental changes.

The data analysis system may thus enable different types of data analysis based on consistent data at the source and target database systems. In particular, the target database system may be used to process complex queries while the source database system may process simplified queries. The processing of the data at the target database system may further be improved by using additional database systems to process said data of the target database system. Said additional database systems may be referred to as external database systems as they may not belong to the data analysis system. Each of the external database systems may connect to the data analysis system via a connection, wherein the connection may, for example, be a network connection over a network. The network may, for example, comprise a local area network (LAN), a general wide area network (WAN), and/or a public network (e.g., the Internet). In order to process the data at the target database system, each external database system may use a copy of said data locally at the external database system. However, as mentioned before, the logging at the target database system may be disabled for certain transactions. Thus, propagating the copy of the data to the external database system using change data capture based on transaction logs of the primary target transaction log may not provide an accurately synchronized copy of data. The present subject matter may solve this issue by creating a secondary transaction log. The secondary transaction log may be maintained by a system, herein referred to as a secondary transaction log system. The secondary transaction log system may or may not be part of the data analysis system. Moreover, the target database system may be configured to forward any received data change from the source database system to the secondary transaction log system. Receiving a data change means receiving an indication of the data change. According to one embodiment, the data change is a first type data change or a second type data change. The first type data change comprises the creation of a (whole) object or replacement of an existing object. The object may be a table or table partition. The second type data change comprises any one of: insertion of one or more new records in an existing table, deletion of one or more records of an existing table and update of one or more records in an existing table. The received indication of the second type data change may comprise one or more log entries, wherein each log entry may comprise a data record (or row) that has been inserted to, deleted from or changed in a table. The secondary transaction log system may add or insert one log entry in the secondary transaction log for each received data change of the second type. The added log entry may be the log entry included in the received data change of the second type. The received indication of the first type data change may comprise the object and an indication whether the object is an update of an existing object or a new object.

The log entry (which may also be referred to as log record) of the secondary transaction log may, for example, comprise a timestamp, log record sequence number (LRSN) and attribute changes. More specifically, the log entry may, for example, contain information defining (1) the table being changed or created, (2) the value of the key column in the row being changed, (3) the old and new values of all columns of the changed row, and (4) the transaction (unit of work) causing the change. By definition, an insert is a new data record and therefore has no old values. For delete changes, there is by definition no new data record, only an old data record. Thus, log entries for inserted rows may contain only new column values while log entries for deleted rows may contain only old column values. Log entries for updated rows may contain the new and old values of all row columns. The order of log entries in the secondary transaction log may reflect the order of change operations of the transactions.

A first type data change may, for example, comprise the creation of a new object, named source object, in the source database system. In response to that, a new object, named target object, that comprises a copy of the source object, may be created in the target database system using the load program. The creation of the target object may, for example, be performed by using a snapshot. The snapshot of the source object may be taken by unloading it from the source database system and loading it into the target database system. This snapshot may represent a consistent point in time of the source object. Then, the snapshot may be used to create the copy in the target database system. The data associated with the first type data changes may thus be named snapshot data. After that, the source object may be altered or changed by the second type data change by insertion and/or deletion and/or modification of one or more data records. As soon as the source object is altered, the source and the target objects may be inconsistent. To synchronize the source and target objects, the second type data changes to data in the source object may be applied to the target object using the replication program.

The set of external database systems may be configured to access to the secondary transaction log in the secondary transaction log system. For example, the secondary transaction log may be copied locally in the external database systems. Alternatively, the secondary transaction log may be stored in a remote system such as the secondary transaction log system, wherein the external database systems may be configured to connect to the remote system and access the secondary transaction log. Each external database system of the set of external database systems may be configured to apply the changes described in the secondary transaction log in order to have a copy of the data of the target database system on the external database system. This may enable the external database system to use a consistent copy of the data in order to perform a local processing of the data. This processing may thus provide accurate and reliable results. This may also enhance the functionality of the target database system by using extra resources for performing more analysis. The present subject matter may provide a method to enable further propagation of non-logged changes (from the perspective of the target database system) to an external database system using a secondary extended transaction log maintained outside of the target database system. Indeed, the secondary transaction log may be maintained outside of the target database system and may be used to further propagate snapshot data or incremental changes to an external database system although some data is copied to the target database without transaction logging, which may prohibit using change data capture based on transaction logs. For example, snapshot data may be forwarded to the secondary transaction log system maintaining the secondary transaction log (e.g., over a network). This splicing of incoming snapshot data may minimally impact load performance on the target database system while keeping the performance benefits entailed by non-logged changes.

According to one embodiment, the method further comprises removing log entries of the secondary transaction log in response to determining that changes associated with the removed entries have been applied by all the external database systems. This may save storage resources and processing resources required for maintaining unnecessary log entries. According to one embodiment, the determining that an entry has been used by the external database system is performed using subscription information of the external database system, the subscription information comprising information on the applying of the changes at the external database system. A subscription may be a connection that is used to replicate data between the data analysis system and the external database system. It may contain details of the data that is being replicated and/or how the data changes are applied to the external database system. According to one embodiment, the method further comprises: storing the secondary transaction log in a physical log buffer; associating with each external database system of the set of external database systems a logical log buffer tracking a subscription progress of the respective external database system, wherein the removing of the entries is performed using the physical log buffer and the logical log buffers. The physical log buffer may be part of the secondary transaction log system or be part of another system that is accessible by the secondary transaction log system and the external database systems. The logical log buffers may be part of the external database systems respectively or be part of the secondary transaction log system.

These embodiments may enable the secondary transaction log system to organize to-be-stored log entries in a log buffer component. The log buffer may be organized in a logical log buffer and a physical log buffer. There may be a logical log buffer per subscribing database external system. Each logical log buffer may be associated with a physical log buffer that actually stores the log entries. The physical log buffer may be shared between multiple logical log buffers. Each logical log buffer may track the subscription progress, e.g., a timestamp or a logical log sequence number, of the corresponding subscribing external database system. The subscription progress information of all logical log buffers that are associated with a physical log buffer may be used by the physical log buffer to determine which log entries need to be kept inside the physical log buffer and which ones may be pruned because all subscribers have already consumed the log records. This pruning optimization may minimize the storage volume for storing log entries inside the buffer as well as the efforts for their maintenance. This pruning optimization may be applied because, unlike transaction logs that are integral part of the (target) database system, the logs inside the secondary transaction log system may be just used for (incremental) change replication, not for crash recovery purposes.

According to one embodiment, the log entry of a received data change is created if the received data change does not roll back a previously received data change, wherein the method further comprises: in response to determining that the received data change rolls back a previously received data change, marking the log entry of the previously received data change as a compensation record by adding in a compensation buffer tag data indicative of the log entry created for the previously received data change; and using the tag data by the external database systems for the applying of the data changes, wherein the applying is performed using log entries which are not marked as compensation records. This embodiment may save processing resources required for applying changes that cancel each other. This embodiment may, for example, be implemented by a change compensation logic of the secondary transaction log system. In one example, the change compensation logic may be disabled or enabled by each external database system using global or table-level configuration settings. If the change compensation logic is enabled by a given external database system, the given external database system may check the content of the compensation buffer in order to apply the changes in the secondary transaction log as described above. If the change compensation logic is disabled by the given external database system, the given external database system may apply all changes in the secondary transaction log without using the compensation buffer. This may enable any of the external systems subscribing to the change records to decide whether to apply this compensation technique for data changes that nullify each other or not.

According to one embodiment, the data comprises rows with associated partition identifiers (IDs). The method further comprises indexing the secondary transaction log using the partition IDs and using the index for creating log entries in the secondary transaction log. For example, the partition IDs may enable to identify easily one or more log entries in the secondary transaction log.

According to one embodiment, the index is a hash table or a tree-based index structure, for organizing access paths to log entries.

According to one embodiment, the data comprises rows with associated partition IDs, wherein in case the data change comprises an updated data object to replace an existing data object, the method comprises: inserting, in the secondary transaction log, log entries indicating a bulk-removal of all records having a partition ID of the existing data object before inserting, in the secondary transaction log, log entries for the insertion of the updated data object.

The data of the first type data changes may be partitioned where each partition represents a set of table rows and is uniquely identified with an (internal) partition ID. The partition ID information may be part of the loaded data snapshots, either as part of each row or as metadata information in the header of a larger set of rows that are transferred from the source database system to the target database system and/or from the target database system to the secondary transaction log system. Alternatively, the target database system may inject partition IDs into the snapshots transferred if none is provided by the source database system. The injected partition ID may be derived from the data inside the replicated snapshot rows, e.g., computing a hash value over a subset of (key) column values in the row. The partition ID information may be used by the secondary transaction log system to organize access paths to buffered transaction log entries, e.g., using tree-based index structures or hash tables, to accelerate the filtering process that identifies those log entries that should be appended to or removed from or replaced inside the log storage. The filtered snapshot data that is applied to the buffer of log records inside the transaction log system may utilize an adaptive apply technique to optimize the apply process, e.g., bulk-removing all records from the log having an ID of the snapshot data to be applied before inserting the most recent snapshot records again, ignoring non-existing records inside the log buffer (for newly inserted records inside the snapshot).

According to one embodiment, creating, in the secondary transaction log for each received data change, at least one log entry comprises: in response to determining that a received data change is the first type data change involving an update of a given table that has been previously loaded, performing the following: for each record of the previously loaded table, creating a log entry indicating a deletion of the record; and for each record of the updated table, creating a log entry indicating an insertion of the record. A log entry indicating a deletion of a record may comprise at least a value indicating a deletion operation and the record to be deleted. By reading the log entry, a system may derive that the record indicated in the log entry is to be deleted. A log entry indicating an insertion of a record may comprise at least a value indicating an insertion operation and the record to be inserted. By reading the log entry, a system may derive that the record indicated in the log entry is to be inserted.

According to one embodiment, creating in the secondary transaction log for each received data change at least one log entry comprises: in response to determining that a received data change is the first type data change involving an update of a given table that has been previously loaded, performing the following: analyzing the received first type data change for identifying second type data changes that affect the previously loaded table; and for each identified second type change, creating a log entry indicating the change. For example, by comparing the previously loaded table and the given table, it may be determined that one or more records have been updated and/or deleted and/or inserted. That is, one or more second type changes have been applied on said one or more records respectively; e.g., if one record has been updated, this indicates that a second type change has been applied on this record, wherein the second type change is an update operation. These one or more second type changes are the identified second type changes of this embodiment.

According to one embodiment, creating in the secondary transaction log for each received data change at least one log entry comprises: in response to determining that a received data change is the first type data change involving a creation of a given table, performing the following: for each record of the table, creating a log entry indicating an insertion of the record. This embodiment may enable an initial load of a table or partition of a table.

FIG. 1 is a block diagram for a computer system in accordance with an example of the present subject matter. The computer system 10 comprises a data analysis system 11. The data analysis system 11 comprises a source database system 12 and target database system 13. An example implementation of the data analysis system 11 is described with reference to FIG. 2. The computer system 10 further comprises a secondary transaction log system 15 and a set of n external database systems 20.1, . . . 20.n, where n>1. The data analysis system 11 is configured to synchronize data of the source database system 12 with data in the target database system 13. This may be performed by using a primary source transaction log at the source database system 12, e.g., as a soon as a new log entry of a new second type data change is entered in the primary source transaction log, that data change which is referred to as incremental change 2 in FIG. 1 may be propagated or sent to a data distribution component 19 of the target database system 13 in order to apply (as indicated by reference number 2.a) the change in the target database system 13 and to log the change in the primary target transaction log 21. The data distribution component 19 may further send (2.b) the data change to the secondary transaction log system 15 in order to create a log entry for the data change in a secondary transaction log 17. The synchronization may further be performed by sending snapshot of data (reference number 1) to the data distribution component 19. The snapshot data may represent a first type data change e.g., that involves an initial load of a whole table in the target database system or an update (reload) of a whole table in the target database system. This first type change is applied (1.a) at the target database system 13 but it is not logged in the primary target transaction log 21. The data distribution component 19 may send (1.b) the snapshot data to the secondary transaction log system 15 in order to create at least one log entry for the first type data change of the snapshot data in the secondary transaction log 17.

The secondary transaction log 17 may be used (parsed) by the external database system 20.1, . . . , 20.n (e.g., using the CDC technique) in order to apply the corresponding data changes in the external database systems. This may enable that each external database system may have the same copy of data of the target database system 13.

Figure 2:
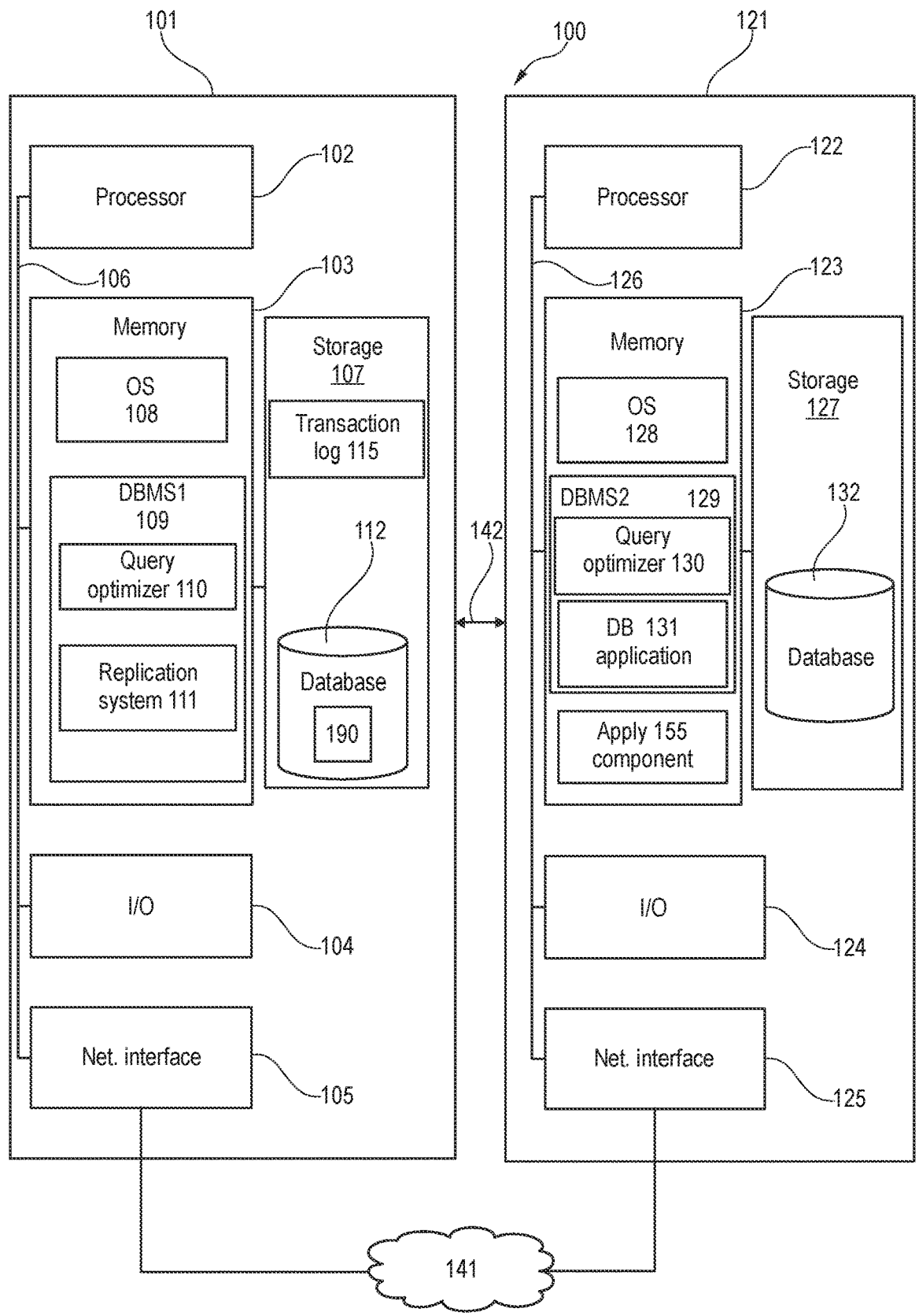
FIG. 2 is a block diagram for a data analysis system in accordance with an example of the present subject matter.

FIG. 2 is a block diagram for a data analysis system in accordance with an example of the present subject matter. The data analysis system 100 may, for example, comprise IBM Db2 Analytics Accelerator for z/OS (IDAA). The data analysis system 100 comprises a source database system 101 connected to a target database system 121. The source database system 101 may, for example, comprise IBM Db2 for z/OS. The target database system 121 may, for example, comprise IBM Db2 Warehouse (Db2 LUW).

Source database system 101 includes processor 102, memory 103, I/O circuitry 104 and network interface 105 coupled together by bus 106.

Processor 102 may represent one or more processors (e.g., microprocessors). The memory 103 can include any one or combination of volatile memory elements (e.g., random access memory (RAM, such as DRAM, SRAM, SDRAM, etc.)) and nonvolatile memory elements (e.g., ROM, erasable programmable read only memory (EPROM), electronically erasable programmable read only memory (EEPROM), programmable read only memory (PROM). Note that the memory 103 can have a distributed architecture, where various components are situated remote from one another, but can be accessed by the processor 102.

Memory 103 in combination with persistent storage device 107 may be used for local data and instruction storage. Storage device 107 includes one or more persistent storage devices and media controlled by I/O circuitry 104. Storage device 107 may include magnetic, optical, magneto optical, or solid-state apparatus for digital data storage, for example, having fixed or removable media. Sample devices include hard disk drives, optical disk drives and floppy disks drives. Sample media include hard disk platters, CD-ROMs, DVD-ROMs, BD-ROMs, floppy disks, and the like. The storage 107 may comprise a first database 112. The first database 112 may, for example, comprise one or more first tables 190.

Memory 103 may include one or more separate programs, e.g., database management system DBMS1 109, each of which comprises an ordered listing of executable instructions for implementing logical functions, notably functions involved in embodiments of this invention. The software in memory 103 shall also typically include a suitable operating system (OS) 108. The OS 108 essentially controls the execution of other computer programs for implementing at least part of methods as described herein. DBMS1 109 comprises a replication system 111 and a query optimizer 110. The replication system 111 may comprise a log reader (not shown). The log reader may read log records (also referred to as log entries) of a transaction recovery log 115 of the source database system 101 and provide changed records to the target database system 121. The transaction recovery log 115 may be referred to as primary source transaction log. The usual content of a log record may comprise a timestamp, log record sequence number (LRSN) and attribute changes. More specifically, the log records in the transaction recovery log 115 may, for example, contain information defining (1) the table being changed, (2) the value of the key column in the row being changed, (3) the old and new values of all columns of the changed row, and (4) the transaction (unit of work) causing the change. By definition, an insert is a new data record and therefore has no old values. For delete changes, there is by definition no new data record, only an old data record. Thus, log records for inserted rows may contain only new column values while transaction log records for deleted rows may contain only old column values. Log records for updated rows may contain the new and old values of all row columns. The order of log records in the primary source transaction log 115 may reflect the order of change operations of the transactions and the order of transaction commit records may reflect the order in which transactions are completed. The type of row operations in log records can, for example, be delete, insert or update. The log reader may read log records from the recovery log, extract relevant modification or change information (inserts/updates/deletes targeting tables in replication). Extracted information may be transmitted (e.g., as a request for application of the change) to target database system 121. The query optimizer 110 may be configured for generating or defining query plans for executing queries e.g., on first database 112.

Target database system 121 includes processor 122, memory 123, I/O circuitry 124 and network interface 125 coupled together by bus 126.

Processor 122 may represent one or more processors (e.g., microprocessors). The memory 123 can include any one or combination of volatile memory elements (e.g., random access memory (RAM, such as DRAM, SRAM, SDRAM, etc.)) and nonvolatile memory elements (e.g., ROM, erasable programmable read only memory (EPROM), electronically erasable programmable read only memory (EEPROM), programmable read only memory (PROM). Note that the memory 123 can have a distributed architecture, where various components are situated remote from one another, but can be accessed by the processor 122.

Memory 123 in combination with persistent storage device 127 may be used for local data and instruction storage. Storage device 127 includes one or more persistent storage devices and media controlled by I/O circuitry 124. Storage device 127 may include magnetic, optical, magneto optical, or solid-state apparatus for digital data storage, for example, having fixed or removable media. Sample devices include hard disk drives, optical disk drives and floppy disks drives. Sample media include hard disk platters, CD-ROMs, DVD-ROMs, BD-ROMs, floppy disks, and the like.

Memory 123 may include one or more separate programs e.g., database management system DBMS2 129 and apply component 155, each of which comprises an ordered listing of executable instructions for implementing logical functions, notably functions involved in embodiments of this invention. The software in memory 123 shall also typically include a suitable OS 128. The OS 128 essentially controls the execution of other computer programs for implementing at least part of methods as described herein. DBMS2 129 comprises a DB application 131 and a query optimizer 130. The DB application 131 may be configured for processing data stored in storage device 127. The query optimizer 130 may be configured for generating or defining query plans for executing queries e.g., on a second database 132. The apply component 155 may apply received changes to the second database 132. The apply component 155 may buffer log records sent from the log reader and consolidate the changes into batches to improve efficiency when applying the modifications to the second database 132 via a bulk-load interface. This may enable to perform replication.

Source database system 101 and target database system 121 may be independent computer hardware platforms communicating through a high-speed connection 142 or a network 141 via network interfaces 105, 125. The network 141 may, for example, comprise a local area network (LAN), a general wide area network (WAN), and/or a public network (e.g., the Internet). Each of the source and target database systems 101 and 121 may be responsible for managing its own copies of the data.

Although shown in FIG. 2 as separate systems, the source and target database systems may belong to a single system, e.g., sharing a same memory and processor hardware, while each of the source and target database systems is associated with a respective DBMS and datasets e.g., the two DBMS s may be stored in the shared memory. In another example, the two database management systems DBMS1 and DBMS2 may form part of a single DBMS that enables communications and method performed by DBMS1 and DBMS2 as described herein. The first and second datasets may be stored on a same storage or on separate storages.

Figure 3:
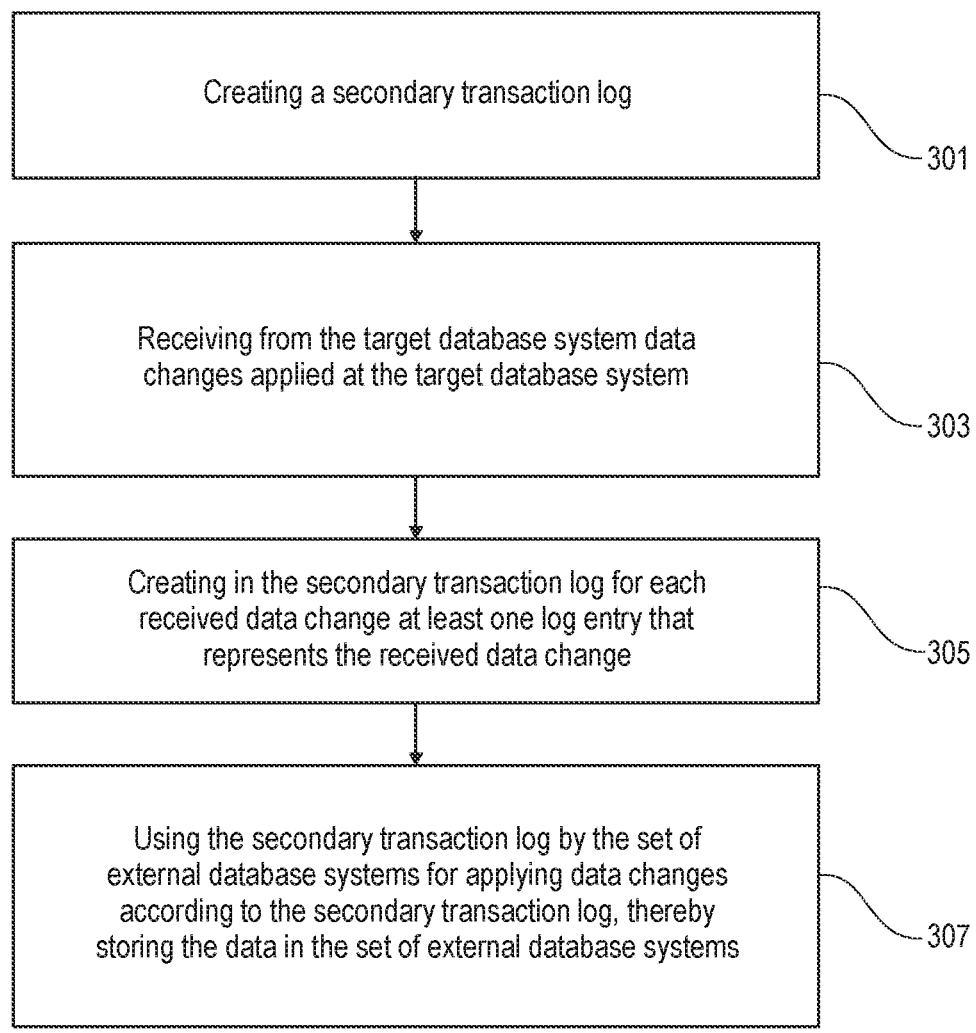
FIG. 3 is a flowchart of a method for enabling access to data of data analysis system in accordance with an example of the present subject matter.

FIG. 3 is a flowchart of a method for enabling access to data of a data analysis system by a set of one or more external database systems. For the purpose of explanation, the method described in FIG. 3 may be implemented in the system illustrated in FIG. 1 but is not limited to this implementation.

A secondary transaction log 17 may be created in step 301 by the secondary transaction log system 15. The secondary transaction log may, for example, be stored in a log buffer. After creating the secondary transaction log, steps 303 to 307 may repeatedly be performed. The repetition may be performed while at least one external database system is (still) using a copy of the data of the data analysis system.

The secondary transaction log system 15 may receive in step 303 from the target database system 13 each data change applied at the target database system 13. For example, the data changes may be received as a stream of data changes. For each received data change, the secondary transaction log system 15 may create in the secondary transaction log 17 in step 305 a log entry that represents the received data change.

Each external database system of the set of external database systems 20.1, . . . , 20.n may use in step 307 the secondary transaction log 17 for applying data changes according to the secondary transaction log. The external database system may read the log entry and apply the change associated with the log entry in the external database system e.g., if the log entry represents an insert of a record of a new table or a new partition of table, the external database system may create the new table (if not already created) and insert the new record in the created table. This may result in storing the data in the set of external database systems 20.1, . . . , 20.n.

Figure 4:
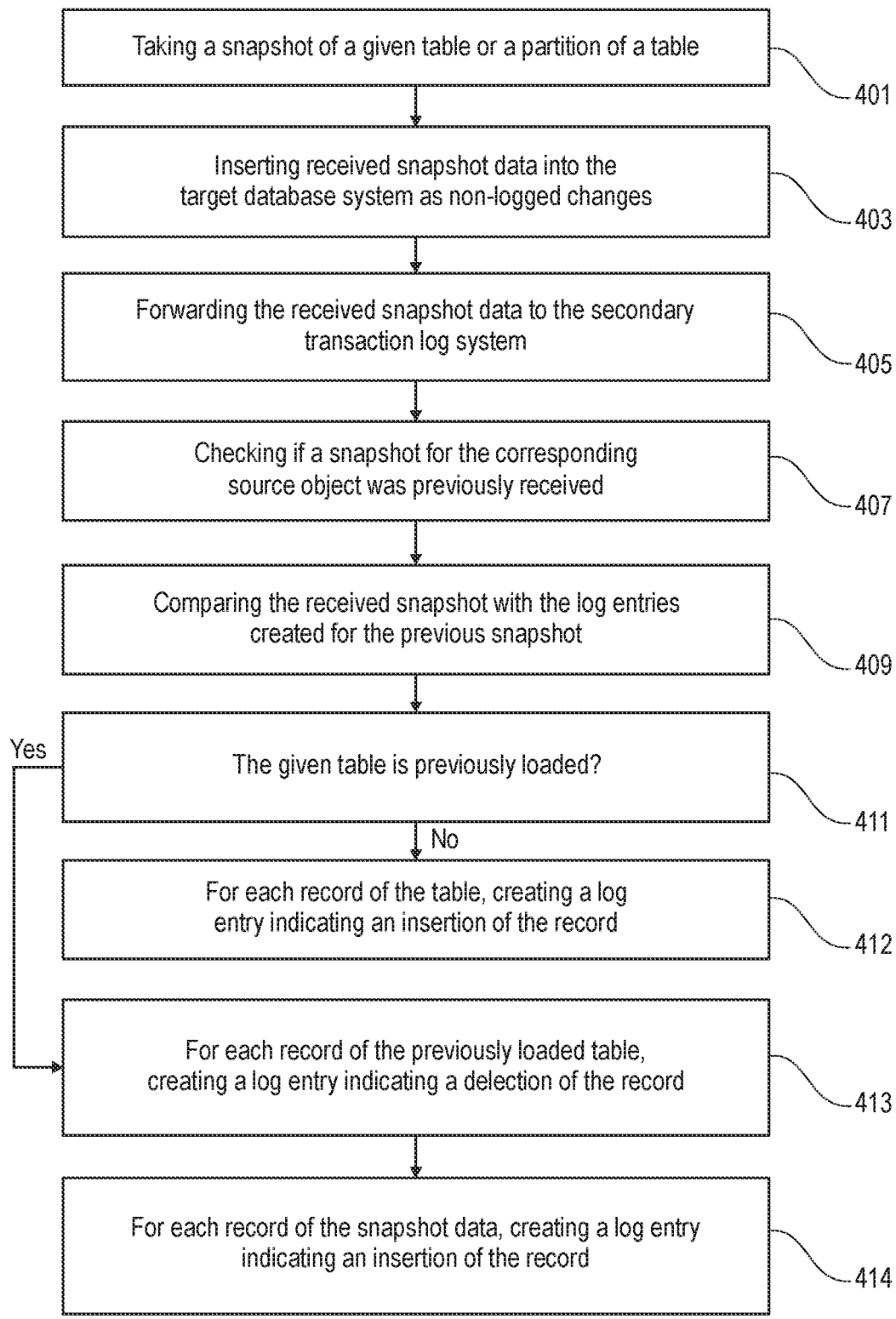
FIG. 4 is a flowchart of a method for creating log entries for first type data changes in a secondary transaction log in accordance with an example of the present subject matter.

FIG. 4 is a flowchart of a method for creating log entries for first type data changes in a secondary transaction log in accordance with an example of the present subject matter. For the purpose of explanation, the method described in FIG. 4 may be implemented in the system illustrated in FIG. 1, but is not limited to this implementation.

The steps to maintain a secondary transaction log 17 outside the target database system 13 to further process non-logged changes (from the perspective of the target database system) to an external database system may be as follows.

In step 401, a snapshot of a table or a partition of a table is taken by unloading it from the source database in the source database system 12 and copying it to a data distribution component in the target database system 13. The data distribution component may be completely decoupled from the target database system 13 or be part of the target database system 13.

The data distribution component inserts in step 403 received snapshot data into the target database system 13 as non-logged changes to improve load performance.

In addition, the data distribution component forwards in step 405 the received snapshot data (e.g., over a network) to the secondary transaction log system 15 which creates corresponding log entries and inserts them into the secondary transaction log 17.

The secondary transaction log system 15 receives snapshots and checks in step 407 if a snapshot for the corresponding source object was previously received. If a snapshot was previously received, the source object was completely copied to the target database. In this case, the secondary transaction log system 15 compares in step 409 the received snapshot with the log entries created for the previous snapshot and computes the differences.

If (step 411) the received snapshot represents a new table, for each record of the new table, a log entry may be created in step 412 in the secondary transaction log, wherein the log entry describes an insertion operation of a respective record of the new table. If (step 411) the received snapshot represents a table that is previously loaded. That is, the snapshot data is an update table for replacing the (whole) existing table. In this case, steps 413 to 414 may be performed. In step 413, a log entry may be created for each record of the previously loaded table. These log entries may indicate that the records of the previously loaded table have to be deleted. In step 414, a log entry may be created for each record of the update table. These log entries may indicate that the records of the upload table have to be inserted.

Figure 6:
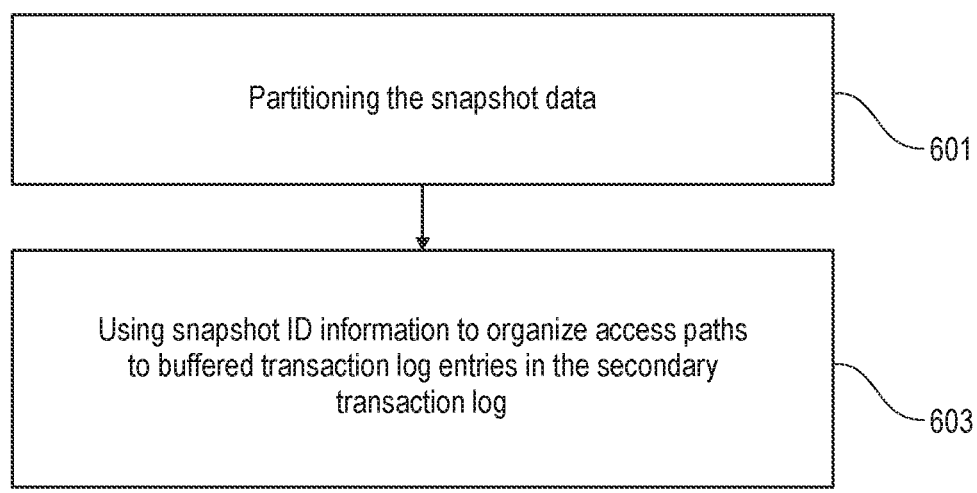
FIG. 6 is a flowchart of a method for accessing log entries in a secondary transaction log in accordance with an example of the present subject matter.

The method of FIG. 4 may provide a filtering and transformation process that allows using change data capture based on the secondary transaction log 17 using the following method of FIG. 6.

Figure 5:
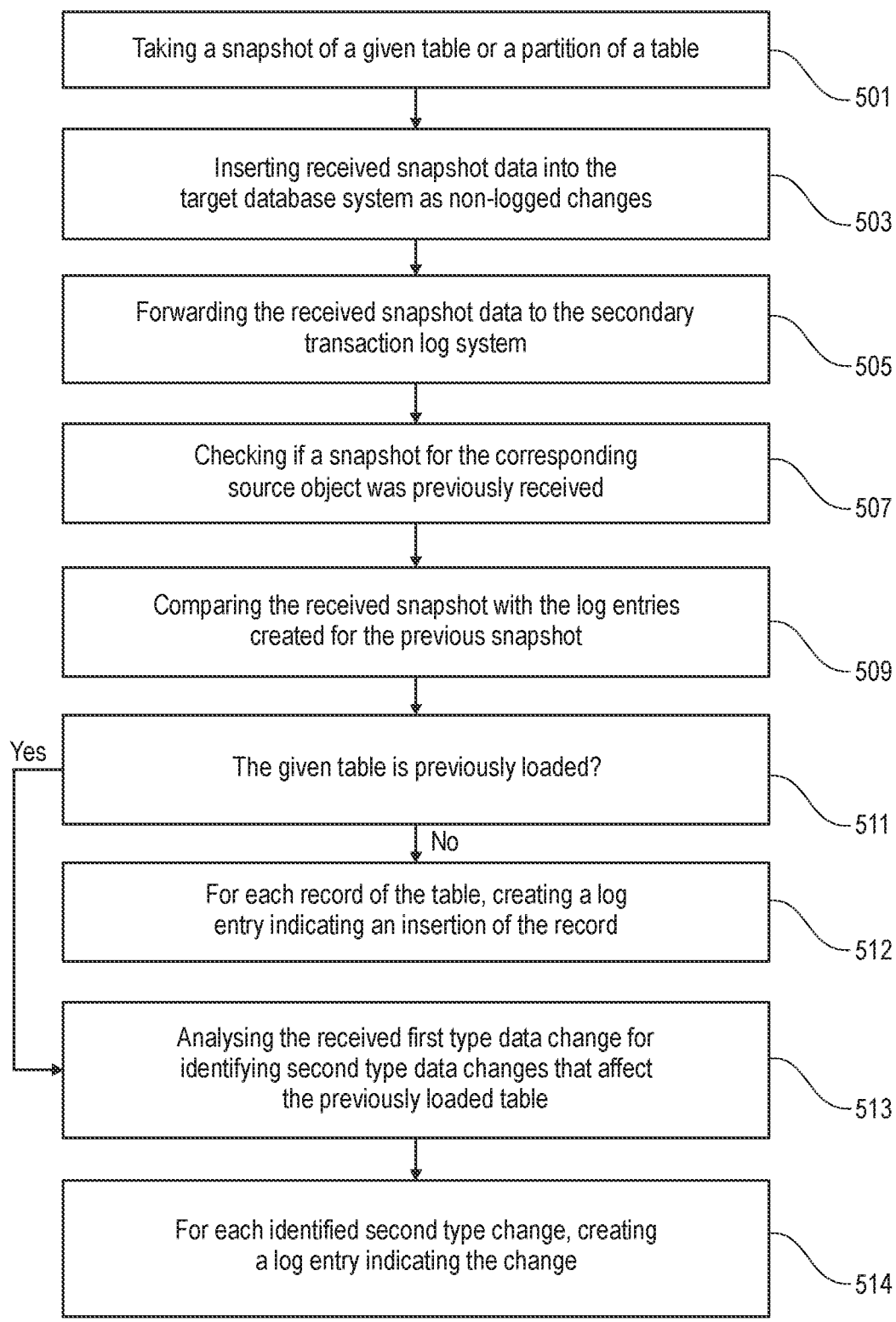
FIG. 5 is a flowchart of a method for accessing log entries in a secondary transaction log in accordance with an example of the present subject matter.

FIG. 5 is a flowchart of a method for creating log entries for first type data changes in a secondary transaction log in accordance with an example of the present subject matter. For the purpose of explanation, the method described in FIG. 5 may be implemented in the system illustrated in FIG. 1, but is not limited to this implementation. The steps to maintain a secondary transaction log 17 outside the target database system 13 to further process non-logged changes (from the perspective of the target database system) to an external database system may be as follows. In step 501, a snapshot of a table or a partition of a table is taken by unloading it from the source database in the source database system 12 and copying it to a data distribution component in the target database system 13. The data distribution component may be completely decoupled from the target database system 13 or be part of the target database system 13. The data distribution component inserts in step 503 received snapshot data into the target database system 13 as non-logged changes to improve load performance. In addition, the data distribution component forwards in step 505 the received snapshot data (e.g., over a network) to the secondary transaction log system 15 which creates corresponding log entries and inserts them into the secondary transaction log 17. The secondary transaction log system 15 receives snapshots and checks in step 507 if a snapshot for the corresponding source object was previously received. If a snapshot was previously received, the source object was completely copied to the target database. In this case, the secondary transaction log system 15 compares in step 509 the received snapshot with the log entries created for the previous snapshot and computes the differences. If (step 511) the received snapshot represents a new table, for each record of the new table, a log entry may be created in step 512 in the secondary transaction log, wherein the log entry describes an insertion operation of a respective record of the new table. If (step 511) the received snapshot represents a table that is previously loaded. That is, the snapshot data is an update table for replacing the (whole) existing table. In this case, steps 513 to 514 may be performed. In step 513, the received first type data change may be analyzed for identifying second type data changes that affect the previously loaded table. For example, for each row X in the first type data change the corresponding row Y in the secondary transaction log may be identified. If the row X and the corresponding row Y are the same, then no log entry may need to be added for the row X. If the row X and the corresponding row Y are different e.g., the row X is an update or a replacement of the corresponding row Y, then the second type changes involved by the row X may be determined. The second type changes may comprise a deletion of the row Y followed by an insertion of the row X. In step 514, a log entry may be created for each identified second type change. These log entries may indicate or describe respective changes. Following the above example, two log entries may be added, one entry for deletion of row Y and one log entry for insertion of row X.

FIG. 6 is a flowchart of a method for accessing log entries in a secondary transaction log in accordance with an example of the present subject matter. For the purpose of explanation, the method described in FIG. 6 may be implemented in the system illustrated in FIG. 1, but is not limited to this implementation.

The snapshot data that is replicated from the source database system 12 may be partitioned in step 601 where each partition represents a set of table rows and is uniquely identified with an (internal) partition ID. The partition ID information may be part of the replicated data snapshots, either as part of each row or as metadata information in the header of a larger set of rows that are transferred from the source database system to the data distribution component and/or from the data distribution component to the secondary transaction log system. Alternatively, the data distribution component may inject partition IDs into the snapshots transferred if none is provided by the source database system. The injected ID may be derived from the data inside the replicated snapshot rows, e.g., computing a hash value over a subset of (key) column values in the row.

The snapshot ID information may be used by the secondary transaction log system in step 603 to organize access paths to buffered transaction log entries in the secondary transaction log 17, e.g., using tree-based index structures or hash tables, to accelerate the filtering process that identifies those rows that should be appended to/removed from/replaced inside the log storage.

Figure 7A:
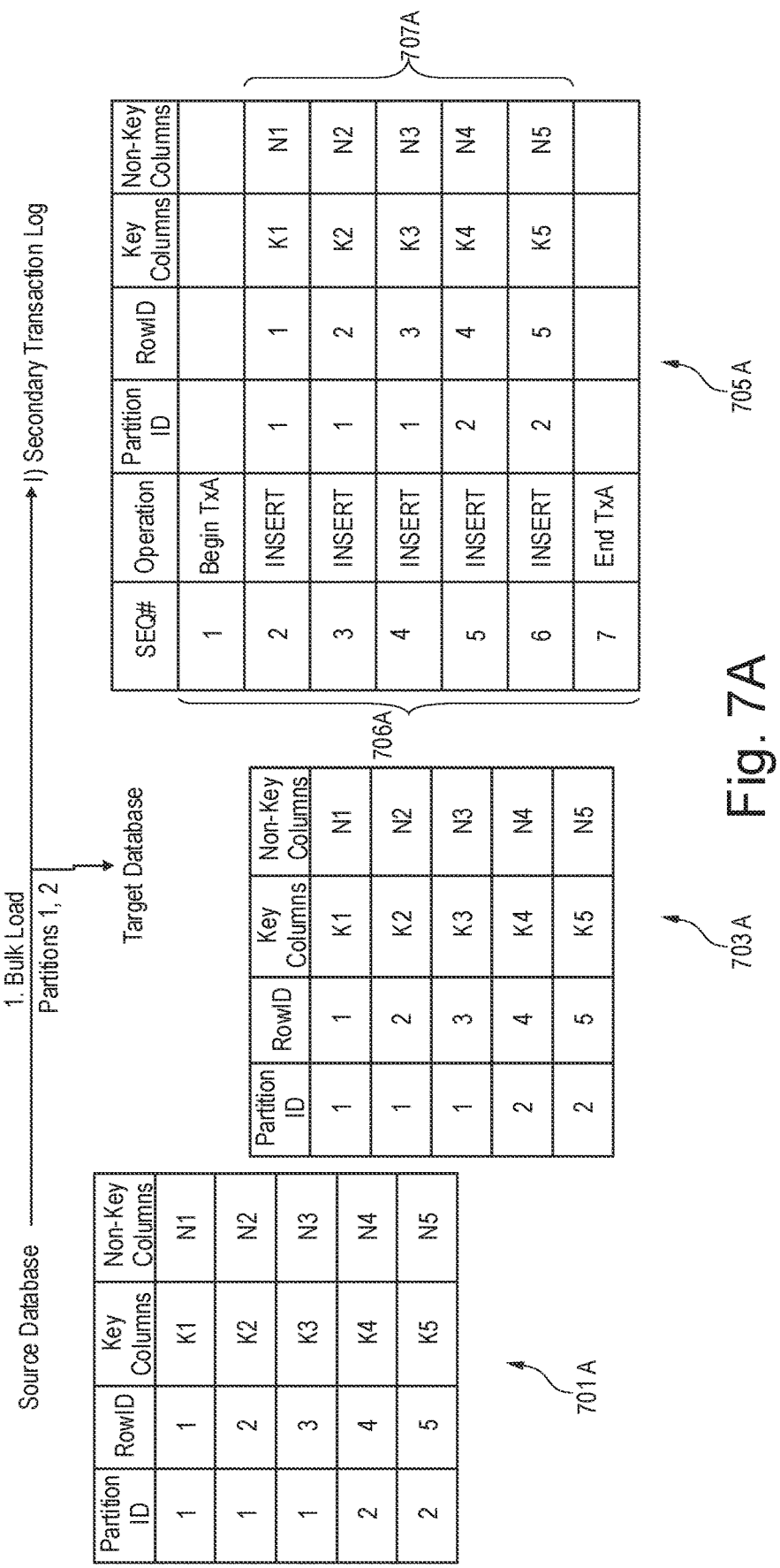
FIGS. 7A-C are block diagrams illustrating a logging method for adding log entries in a secondary transaction log in accordance with an example of the present subject matter.
Figure 7B:
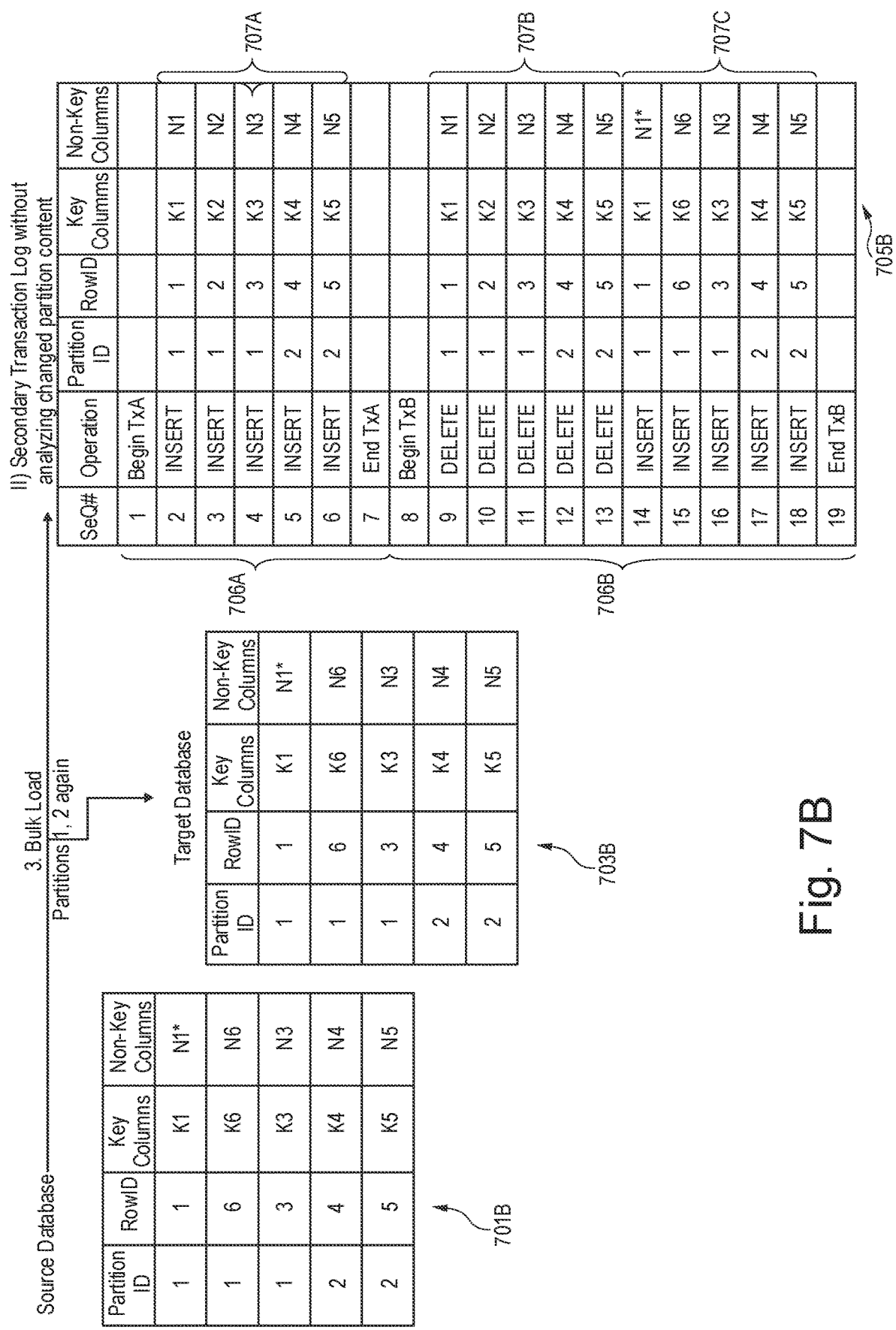
Figure 7C:
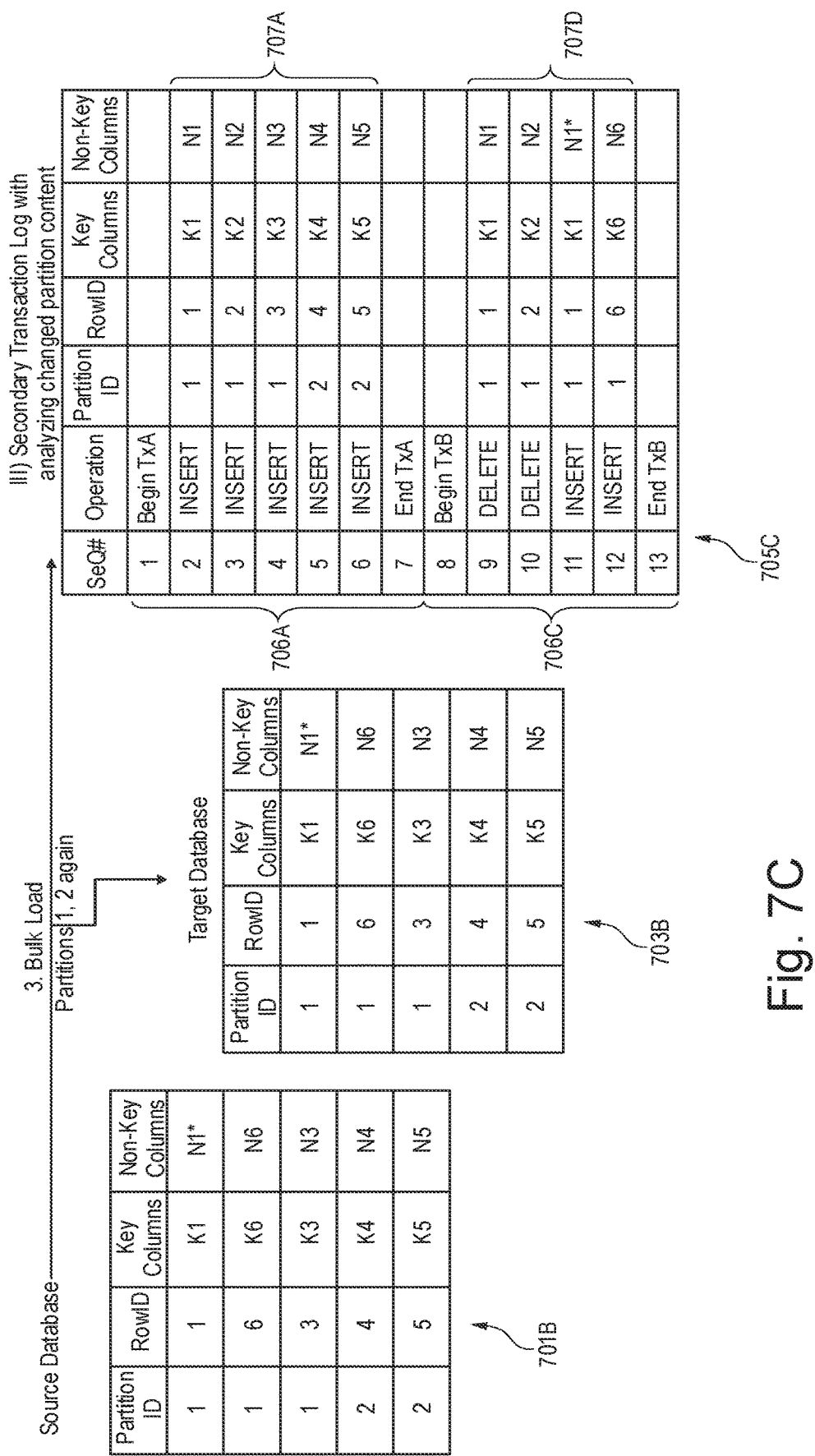

FIGS. 7A-C depict diagrams illustrating the logging of first type data changes in the secondary transaction log. FIG. 7A describes the initial creation of a table, while FIGS. 7B-C describe the update of said table using a first type change. A source table 701A may be created in the source database by a database transaction e.g., named TxA. The creation of the table 701A as a new table may be a first type data change. As shown in FIG. 7A, the source table 701A is loaded (completely) into the target database resulting in target table 703A. The source table 701A comprises five rows having row IDs 1 to 5, and which may be referred to in the following as row 1, row 2, row 3, row 4 and row 5 respectively. The five rows belong to two different partitions as indicated by the partition ID associated with each row. The content of secondary transaction log 705A may be updated to indicate the loading of the new table 703A in the target database. For that, a set of log entries 706A may be created in the secondary transaction log 705A. Each log entry of the set of log entries 706A is associated with a sequence number indicating the order in which it is applied. The set of log entries 706A comprises a subset of log entries 707A. The subset of log entries 707A comprises five log entries associated respectively with the rows 1 to 5. These five log entries 707A have the sequence numbers 2 to 6 as indicated in FIG. 7A. Each log entry of the five log entries 707A comprises an indication of the INSERT operation and the (to be inserted) row associated with the log entry e.g., the first log entry of the five log entries 707A indicates that the row 1 is to be inserted etc. The set of log entries 706A may optionally further comprise two log entries indicating the start and the end of the transaction TxA respectively. The log entry describing the start of the transaction TxA may be assigned the sequence number 1 and the log entry describing the end of the transaction TxA may be assigned the sequence number 7. This set of log entries 706A may enable the external database system to apply the respective changes to have a copy of the table 703A at the external database system.

As shown in FIG. 7B, the current source table 701B has updates compared to the source table 701A. For example, the row 1 of source table 701A is updated (this update is a second type change SCH1), while row 2 of the source table 701A is replaced (this replacement is a second type change SCH2) with another row 6 having row ID 6. The remaining rows 3 to 5 of the source table 701A have not been changed. These changes to the source table 701A may be triggered by a database transaction, named TxB. These individual changes SCH1 and SCH2 of the source table 701A may collectively define a first type change that affects the source table 701A and that needs to be propagated to the target database as indicated in FIG. 7B by performing the loading of the whole current source table 701B to the target database. This may result in updating the content of the target table 703A to match the current source table 701B. This is indicated in FIG. 7B with the current target table 703B. The secondary transaction log 705A may be updated to indicate the loading of the updated table 703B in the target database. The update of the secondary transaction log 705A may be performed using two alternative logging methods as described with reference to FIG. 7B and FIG. 7C respectively.

With the first logging technique shown in FIG. 7B, all partitions that are reloaded may need to be bulk-deleted prior to bulk-inserting them again. That is, since the whole table 701B is reloaded, the secondary transaction log may indicate that the rows 1 to 5 of the initial table 703A have to be deleted before performing the insertion of the rows 1, 3 to 6 of the updated table 703B. The first logging technique may be advantageous when first type change (e.g., a bulk load) and a second type change (e.g., incremental update) run concurrently because changes may make it twice to the target, depending on how fast the source database transaction log is read. As long as a bulk load is running, the incremental update may need to buffer any to-be-replicated changes and may have to nullify any new or updated row with a prior DELETE before doing an insert. This may avoid that it will be seen twice in case the load covered it already. This is illustrated in FIG. 7B, where an additional set of log entries 706B having sequence numbers 8 to 19 may be added to the set of log entries 706A. The set of log entries 706B may comprise a subset of log entries associated with the five rows of the table 701B, so that each row may be associated with two log entries. The subset of log entries may comprise a first subset of 5 log entries 707B having sequence numbers 9 to 13 associated with the five rows of the table 703A respectively. The subset of log entries may further comprise a second subset of 5 log entries 707C having sequence numbers 14 to 18 associated with five rows of the table 703B respectively. Each entry of the first subset of 5 log entries 707B comprises an indication of the DELETE operation and the (to be deleted) row associated with the log entry e.g., the rows of the (initial) target table 703A may first be deleted. Each entry of the second subset of 5 log entries 707C comprises an indication of the INSERT operation and the (to be inserted) row associated with the log entry e.g., the rows of the current target table 703B may be inserted. The set of log entries 706B may optionally further comprise two log entries indicating the start and the end of the transaction TxB respectively. The log entry describing the start of the transaction TxB may be assigned the sequence number 8 and the log entry describing the end of the transaction TxB may be assigned the sequence number 19. This set of log entries 706B may enable the external database system to apply the respective changes to have a copy of the current table 703B at the external database system.

With the second logging method, all rows are analyzed and only the modified ones will lead to change records in the secondary transaction log. This may be performed by comparing whether a row of an incoming change is already covered by the log entries of the secondary transaction log. This comparison may be implemented by parsing and comparing the values of all columns in each row of the received change with the rows indicated in the secondary transaction log. Alternatively, some artificial aggregation of the content may be used as an indicator of a modification. For example, a checksum may be calculated, or some timestamp information may be associated with each row that is updated upon modification. This aggregated info can be used to perform the comparison without scanning through the whole content of each row, which may save a lot of processing overheads. The result of this technique is shown in FIG. 7C. An additional set of log entries 706C having sequence numbers 8 to 13 may be added to the set of log entries 706A having sequence numbers 1 to 7. The set of log entries 706C may comprise a subset of log entries 707D associated with the second type changes SCH1 and SCH2, so that each of the two changes SCH1 and SCH2 may be associated with two log entries. This is because, the change SCH1 may be defined as a sequence of two changes, namely a change to delete the row 1 of the table 703A and a subsequent change to insert the updated row 1 of the table 703B. Similarly, the change SCH2 may be defined as a sequence of two changes, namely a change to delete the row 2 of the table 703A and a subsequent change to insert the new row 6 of the table 703B. The subset of log entries 707D may comprise a first subset of 2 log entries having sequence numbers 9 to 10 associated with the delete changes of SCH1 and SCH2 respectively. The subset of log entries 707D may further comprise a second subset of 2 log entries having sequence numbers 11 to 12 associated with the insert changes of SCH1 and SCH2 respectively. Each entry of the first subset of 2 log entries comprises an indication of the DELETE operation and the (to be deleted) row associated with the log entry. Each entry of the second subset of 2 log entries comprises an indication of the INSERT operation and the (to be inserted) row associated with the log entry. The set of log entries 706C may optionally further comprise two log entries indicating the start and the end of the transaction TxB respectively. The log entry describing the start of the transaction TxB may be assigned the sequence number 8 and the log entry describing the end of the transaction TxB may be assigned the sequence number 13. This set of log entries 706C may enable the external database system to apply the respective changes to have a copy of the current table 703B at the external database system.

Computing environment 800 contains an example of an environment for the execution of at least some of the computer code involved in performing the inventive methods, such as a secondary transaction logging code 900. In addition to block 900, computing environment 800 includes, for example, computer 801, wide area network (WAN) 802, end user device (EUD) 803, remote server 804, public cloud 805, and private cloud 806. In this embodiment, computer 801 includes processor set 810 (including processing circuitry 820 and cache 821), communication fabric 811, volatile memory 812, persistent storage 813 (including operating system 822 and block 900, as identified above), peripheral device set 814 (including user interface (UI) device set 823, storage 824, and Internet of Things (IoT) sensor set 825), and network module 815. Remote server 804 includes remote database 830. Public cloud 805 includes gateway 840, cloud orchestration module 841, host physical machine set 842, virtual machine set 843, and container set 844.

Figure 8:
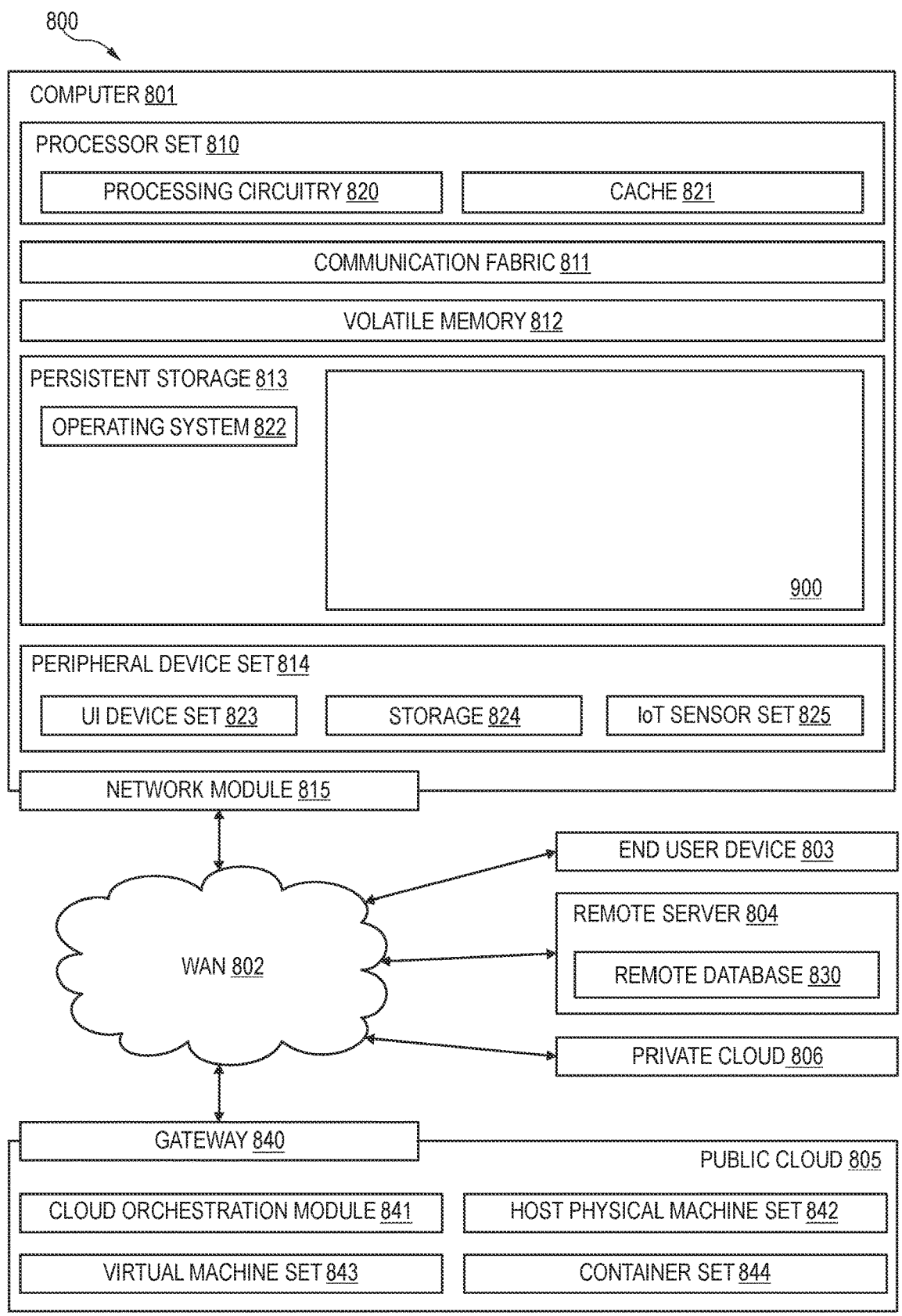
FIG. 8 is a computing environment in accordance with an example of the present subject matter.

COMPUTER 801 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 830. As is well understood in the art of computer technology, and depending upon the technology, performance of a computer-implemented method may be distributed among multiple computers and/or between multiple locations. On the other hand, in this presentation of computing environment 800, detailed discussion is focused on a single computer, specifically computer 801, to keep the presentation as simple as possible. Computer 801 may be located in a cloud, even though it is not shown in a cloud in FIG. 8. On the other hand, computer 801 is not required to be in a cloud except to any extent as may be affirmatively indicated.

PROCESSOR SET 810 includes one, or more, computer processors of any type now known or to be developed in the future. Processing circuitry 820 may be distributed over multiple packages, for example, multiple, coordinated integrated circuit chips. Processing circuitry 820 may implement multiple processor threads and/or multiple processor cores. Cache 821 is memory that is located in the processor chip package(s) and is typically used for data or code that should be available for rapid access by the threads or cores running on processor set 810. Cache memories are typically organized into multiple levels depending upon relative proximity to the processing circuitry. Alternatively, some, or all, of the cache for the processor set may be located "off chip." In some computing environments, processor set 810 may be designed for working with qubits and performing quantum computing.

Computer readable program instructions are typically loaded onto computer 801 to cause a series of operational steps to be performed by processor set 810 of computer 801 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 821 and the other storage media discussed below. The program instructions, and associated data, are accessed by processor set 810 to control and direct performance of the inventive methods. In computing environment 800, at least some of the instructions for performing the inventive methods may be stored in block 900 in persistent storage 813.

COMMUNICATION FABRIC 811 is the signal conduction path that allows the various components of computer 801 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 812 is any type of volatile memory now known or to be developed in the future. Examples include dynamic type random access memory (RAM) or static type RAM. Typically, volatile memory 812 is characterized by random access, but this is not required unless affirmatively indicated. In computer 801, the volatile memory 812 is located in a single package and is internal to computer 801, but, alternatively or additionally, the volatile memory may be distributed over multiple packages and/or located externally with respect to computer 801.

PERSISTENT STORAGE 813 is any form of non-volatile storage for computers that is now known or to be developed in the future. The non-volatility of this storage means that the stored data is maintained regardless of whether power is being supplied to computer 801 and/or directly to persistent storage 813. Persistent storage 813 may be a read only memory (ROM), but typically at least a portion of the persistent storage allows writing of data, deletion of data and re-writing of data. Some familiar forms of persistent storage include magnetic disks and solid state storage devices. Operating system 822 may take several forms, such as various known proprietary operating systems or open source Portable Operating System Interface-type operating systems that employ a kernel. The code included in block 900 typically includes at least some of the computer code involved in performing the inventive methods.

PERIPHERAL DEVICE SET 814 includes the set of peripheral devices of computer 801. Data communication connections between the peripheral devices and the other components of computer 801 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 823 may include components such as a display screen, speaker, microphone, wearable devices (such as goggles and smart watches), keyboard, mouse, printer, touchpad, game controllers, and haptic devices. Storage 824 is external storage, such as an external hard drive, or insertable storage, such as an SD card. Storage 824 may be persistent and/or volatile. In some embodiments, storage 824 may take the form of a quantum computing storage device for storing data in the form of qubits. In embodiments where computer 801 is required to have a large amount of storage (for example, where computer 801 locally stores and manages a large database) then this storage may be provided by peripheral storage devices designed for storing very large amounts of data, such as a storage area network (SAN) that is shared by multiple, geographically distributed computers. IoT sensor set 825 is made up of sensors that can be used in Internet of Things applications. For example, one sensor may be a thermometer and another sensor may be a motion detector.

NETWORK MODULE 815 is the collection of computer software, hardware, and firmware that allows computer 801 to communicate with other computers through WAN 802. Network module 815 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 815 are performed on the same physical hardware device. In other embodiments (for example, embodiments that utilize software-defined networking (SDN)), the control functions and the forwarding functions of network module 815 are performed on physically separate devices, such that the control functions manage several different network hardware devices. Computer readable program instructions for performing the inventive methods can typically be downloaded to computer 801 from an external computer or external storage device through a network adapter card or network interface included in network module 815.

WAN 802 is any wide area network (for example, the internet) capable of communicating computer data over non-local distances by any technology for communicating computer data, now known or to be developed in the future. In some embodiments, the WAN 802 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 803 is any computer system that is used and controlled by an end user (for example, a customer of an enterprise that operates computer 801), and may take any of the forms discussed above in connection with computer 801. EUD 803 typically receives helpful and useful data from the operations of computer 801. For example, in a hypothetical case where computer 801 is designed to provide a recommendation to an end user, this recommendation would typically be communicated from network module 815 of computer 801 through WAN 802 to EUD 803. In this way, EUD 803 can display, or otherwise present, the recommendation to an end user. In some embodiments, EUD 803 may be a client device, such as thin client, heavy client, mainframe computer, desktop computer and so on.

REMOTE SERVER 804 is any computer system that serves at least some data and/or functionality to computer 801. Remote server 804 may be controlled and used by the same entity that operates computer 801. Remote server 804 represents the machine(s) that collect and store helpful and useful data for use by other computers, such as computer 801. For example, in a hypothetical case where computer 801 is designed and programmed to provide a recommendation based on historical data, then this historical data may be provided to computer 801 from remote database 830 of remote server 804.

PUBLIC CLOUD 805 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 805 is performed by the computer hardware and/or software of cloud orchestration module 841. The computing resources provided by public cloud 805 are typically implemented by virtual computing environments that run on various computers making up the computers of host physical machine set 842, which is the universe of physical computers in and/or available to public cloud 805. The virtual computing environments (VCEs) typically take the form of virtual machines from virtual machine set 843 and/or containers from container set 844. It is understood that these VCEs may be stored as images and may be transferred among and between the various physical machine hosts, either as images or after instantiation of the VCE. Cloud orchestration module 841 manages the transfer and storage of images, deploys new instantiations of VCEs and manages active instantiations of VCE deployments. Gateway 840 is the collection of computer software, hardware, and firmware that allows public cloud 805 to communicate through WAN 802.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 806 is similar to public cloud 805, except that the computing resources are only available for use by a single enterprise. While private cloud 806 is depicted as being in communication with WAN 802, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 805 and private cloud 806 are both part of a larger hybrid cloud.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

What is claimed is:

1. A computer-implemented method comprising:
    providing, by one or more processors, a data analysis system comprising a source database system and a target database system, the data analysis system operable to synchronize data in the source database system with the target database system using a primary source transaction log in the source database system and a primary target transaction log in the target database system;
    creating, by one or more processors, a secondary transaction log;
    storing, by one or more processors, the secondary transaction log in a physical log buffer;
    receiving, by one or more processors, from the target database system, data changes applied at the target database system;
    creating, by one or more processors, in the secondary transaction log, for each received data change, at least one log entry that represents the respective received data change;
    associating, by one or more processors, with each external database system of a set of external database systems, a logical log buffer tracking a subscription progress of the respective external database system;
    determining, by one or more processors, that an entry has been used by the external database system by using subscription information of a first external database system of the set of external database systems, the subscription information comprising information on applying changes at the first external database system;
    providing, by one or more processors, the secondary transaction log to the set of external database systems, for causing the data changes to be applied according to the secondary transaction log, thereby causing the data to be stored in the set of external database systems; and
    responsive to determining that changes associated with removed entries have been applied by the set of external database systems, removing, by one or more processors, log entries of the secondary transaction log, where removing the log entries is performed using the physical log buffer and the logical log buffers.

2. The computer-implemented method of claim 1, further comprising responsive to the received data change not rolling back a previously received data change, creating, by one or more processors, a first log entry of a received data change.

3. The computer-implemented method of claim 1, the data comprising rows with associated partition identifiers (IDs), further comprising:
    indexing, by one or more processors, the secondary transaction log using the partition IDs; and
    using, by one or more processors, the index for creating the log entries in the secondary transaction log.

4. The computer-implemented method of claim 3, wherein the index is selected from the group consisting of: a hash table and a tree-based index structure, for organizing access paths to log entries.

5. The computer-implemented method of claim 1, the data comprising rows with associated partition IDs, wherein responsive to the data change comprising an updated data object to replace an existing data object, creating the at least one log entry comprises:
  inserting, by one or more processors, in the secondary transaction log, log entries indicating bulk-removal of all records having a partition ID of the existing data object prior to inserting, in the secondary transaction log, log entries for the insertion of the updated data object.

6. The computer-implemented method of claim 1, wherein:
  each respective data change is selected from the group consisting of: a first type of data change and a second type of data change;
  the first type of data change is a selection from the group consisting of: creation of a new object and an update of an existing object;
  the object is a selection from a group consisting of: a table and a table partition; and
  the second type of data change is a selection from the group consisting of: insertion of one or more new records in an existing table, deletion of one or more records of an existing table, and update of one or more records in an existing table.

7. The computer-implemented method of claim 6, wherein creating, in the secondary transaction log, for each received data change, the at least one log entry comprises:
  responsive to determining that the received data change is the first type of data change, involving an update of a given table that has been previously loaded:
    creating, by one or more processors, for each record of the previously loaded table, a first log entry indicating a deletion of the record; and
    creating, by one or more processors, for each record of the updated table, a second log entry indicating an insertion of the record.

8. The computer-implemented method of claim 6, wherein creating, in the secondary transaction log, for each received data change, the at least one log entry comprises:
  responsive to determining that the received data change is the first type of data change, involving an update of a given table that has been previously loaded:
    analyzing, by one or more processors, the received first type of data change to identify the second type of data changes that affect the previously loaded table; and
    creating, by one or more processors, for each identified second type of data change, a first log entry indicating the data change.

9. The computer-implemented method of claim 6, wherein creating, in the secondary transaction log, for each received data change, the at least one log entry comprises:
  responsive to determining that the received data change is the first type of data change, involving a creation of a given table, creating, by one or more processors, for each record of the table, a first log entry indicating an insertion of the record.

10. The computer-implemented method of claim 1, further comprising:
  responsive to determining that the received data change rolls back a previously received data change, marking, by one or more processors, the at least one log entry of the previously received data change as a compensation record by adding, in a compensation buffer, tag data indicative of the at least one log entry created for the received data change; and
  causing, by one or more processors, the tag data to be used by the set of external database systems for applying the data changes, wherein the application is performed for log entries which unmarked as compensation records.

11. A computer program product comprising:
  one or more computer readable storage media, and program instructions collectively stored on the one or more computer readable storage media, the program instructions comprising:
  program instructions to provide a data analysis system comprising a source database system and a target database system, the data analysis system operable to synchronize data in the source database system with the target database system using a primary source transaction log in the source database system and a primary target transaction log in the target database system;
  program instructions to create a secondary transaction log;
  program instructions to store the secondary transaction log in a physical log buffer;
  program instructions to receive, from the target database system, data changes applied at the target database system;
  program instructions to create, in the secondary transaction log, for each received data change, at least one log entry that represents the respective received data change;
  program instructions to associate with each external database system of a set of external database systems, a logical log buffer tracking a subscription progress of the respective external database system;
  program instructions to determine that an entry has been used by the external database system by using subscription information of a first external database system of the set of external database systems, the subscription information comprising information on applying changes at the first external database system;
  program instructions to provide the secondary transaction log to the set of external database systems, for causing the data changes to be applied according to the secondary transaction log, thereby causing the data to be stored in the set of external database systems; and
  program instructions to, responsive to determining that changes associated with removed entries have been applied by the set of external database systems, remove log entries of the secondary transaction log, where removing the log entries is performed using the physical log buffer and the logical log buffers.

12. The computer program product of claim 11, further comprising program instructions, collectively stored on the one or more computer readable storage media, to, responsive to the received data change not rolling back a previously received data change, create a first log entry of a received data change.

13. A computer system comprising:
  one or more computer processors, one or more computer readable storage media, and program instructions collectively stored on the one or more computer readable storage media for execution by at least one of the one or more computer processors, the program instructions comprising:
  program instructions to provide a data analysis system comprising a source database system and a target database system, the data analysis system operable to synchronize data in the source database system with the target database system using a primary source transaction log in the source database system and a primary target transaction log in the target database system;

program instructions to create a secondary transaction log;

program instructions to store the secondary transaction log in a physical log buffer;

program instructions to receive, from the target database system, data changes applied at the target database system;

program instructions to create, in the secondary transaction log, for each received data change, at least one log entry that represents the respective received data change;

program instructions to associate with each external database system of a set of external database systems, a logical log buffer tracking a subscription progress of the respective external database system;

program instructions to determine that an entry has been used by the external database system by using subscription information of a first external database system of the set of external database systems, the subscription information comprising information on applying changes at the first external database system;

program instructions to provide the secondary transaction log to the set of external database systems, for causing the data changes to be applied according to the secondary transaction log, thereby causing the data to be stored in the set of external database systems; and program instructions to, responsive to determining that changes associated with removed entries have been applied by the set of external database systems, remove log entries of the secondary transaction log, where removing the log entries is performed using the physical log buffer and the logical log buffers.

* * * * *